(12) United States Patent
Jiang et al.

(10) Patent No.: US 10,793,084 B2
(45) Date of Patent: Oct. 6, 2020

(54) ELECTRIC VEHICLE HOLDER (71) Applicant: SHENZHEN WIRELESS TECHNOLOGY CO., LTD., Shenzhen, Guangdong (CN)

(72) Inventors: Yichao Jiang, Guangdong (CN); Minli Yuan, Guangdong (CN); Wei Huang, Guangdong (CN); Xiangyuan Li, Guangdong (CN)

(73) Assignee: SHENZHEN WIRELESS TECHNOLOGY CO., LTD., Shenzhen, Guangdong (CN)

( * ) Notice: Subject to any disclaimer, the term of this patent is extended or adjusted under 35 U.S.C. 154(b) by 182 days.

(21) Appl. No.: 16/305,226

(22) PCT Filed: Jun. 27, 2018

(86) PCT No.: PCT/CN2018/093136
§ 371 (c)(1),
(2) Date: Nov. 28, 2018

(87) PCT Pub. No.: WO2020/000257
PCT Pub. Date: Jan. 2, 2020

(65) Prior Publication Data
US 2020/0010023 A1 Jan. 9, 2020

(51) Int. Cl.
*H02J 7/02* (2016.01)
*B60R 11/02* (2006.01)
*H04M 1/04* (2006.01)
*H04B 1/3877* (2015.01)

(52) U.S. Cl.
CPC .......... *B60R 11/0252* (2013.01); *H02J 7/025* (2013.01); *H04B 1/3877* (2013.01); *H04M 1/04* (2013.01); *B60R 11/0241* (2013.01)

(58) Field of Classification Search
CPC .... B60R 11/0252; H02J 7/025; H04B 1/3877; H04M 1/04
USPC ........................................................ 320/108
See application file for complete search history.

(56) References Cited

U.S. PATENT DOCUMENTS

| 5,836,563 | A | * | 11/1998 | Hsin-Yung | .......... B60R 11/0241 248/316.4 |
| 10,253,926 | B1 | * | 4/2019 | Fan | ........................ F16M 11/14 |
| 2002/0009194 | A1 | * | 1/2002 | Wong | ...................... H04M 1/04 379/449 |
| 2002/0190176 | A1 | * | 12/2002 | Louh | ................... B60R 11/0241 248/316.4 |

(Continued)

*Primary Examiner* — Suresh Memula
(74) *Attorney, Agent, or Firm* — Muncy, Geissler, Olds & Lowe, P.C.

(57) ABSTRACT

The electric vehicle holder includes a housing; clamping arms are respectively inserted into two sides of the housing; the electric vehicle holder further includes an electric mechanism, a circuit board, and a power supply module; a normally open circuit configured to control the electric mechanism to drive the two clamping arms away from each other is arranged on the circuit board; and a detector is further arranged in the housing. By arranging the electric mechanism and arranging the normally open circuit on the circuit board, when the electric vehicle holder is powered on, the two clamping arms are opened; since the clamping arms do not need to be opened manually, the installation of a tablet electronic device is convenient.

15 Claims, 8 Drawing Sheets

(56) References Cited

U.S. PATENT DOCUMENTS

2014/0263931 A1* 9/2014 Chen ................ F16M 13/00
                                                  248/576
2017/0188724 A1* 7/2017 Lin ................ F16M 11/041

* cited by examiner

ELECTRIC VEHICLE HOLDER

CROSS-REFERENCE TO RELATED APPLICATIONS

This application is the International Application No. PCT/CN2018/093136 for entry into US national phase with an international filing date of Jun. 27, 2018, designating US, now pending, the content of which is incorporated herein by reference in its entirety.

TECHNICAL FIELD

The present application belongs to the field of vehicle holders, and more particularly to an electric vehicle holder.

BACKGROUND

At present, people often use tablet electronic devices such as mobile phones for navigation during travel. When driving, they often need to support the tablet electronic devices to facilitate navigation. This requires the use of a vehicle holder. Currently, the vehicle holder generally needs a user to manually pull two clamping arms open. If the tablet electronic device needs to be clamped on the vehicle holder, a two-hand operation is required: one hand pulls the clamping arms open, and the other hand places the tablet electronic device into the vehicle holder. When the tablet electronic device needs to be mounted on the vehicle holder during the driving process, it is necessary to stop the vehicle first for operation, which is inconvenient to use; and if the vehicle does not stop, a safety accident may easily occur.

Technical Problems

An objective of the present application is to provide an electric vehicle holder to solve the problem of inconvenience in use of vehicle holders in the prior art.

Technical Solutions

To this end, the technical solutions adopted by the present application are as follows: an electric vehicle holder includes a housing; clamping arms are respectively inserted into two sides of the housing; the electric vehicle holder further includes an electric mechanism configured to drive the two clamping arms close to or away from each other, a circuit board mounted in the housing, and a power supply module electrically connected to the circuit board; a normally open circuit configured to control the electric mechanism to drive the two clamping arms away from each other when the power supply module is powered on is arranged on the circuit board; the electric mechanism is electrically connected to the circuit board; and a detector configured to enable, upon the detection of that a tablet electronic device is placed on the housing, the circuit board to control the electric mechanism to drive the two clamping arms close to each other to clamp the tablet electronic device is further arranged in the housing.

Further, the detector is a wireless charging coil; the wireless charging coil is mounted in the housing; and the wireless charging coil is electrically connected to the circuit board.

Further, a supporting plate is further mounted in the housing, and the wireless charging coil is mounted on the supporting plate.

Further, a detection switch for limiting a stroke that the two clamping arms are away from each other is disposed in the housing; a shifting piece for pushing the detection switch is arranged on one of the clamping arms, and the detection switch is electrically connected to the circuit board.

Further, the electric mechanism includes two racks for respectively pushing the two clamping arms away from each other, a gear configured to drive the two racks to move synchronously and reversely, and a motor configured to drive the gear to rotate; the two racks are respectively disposed on two sides of the gear; and the gear is meshed with the two racks.

Further, springs for respectively pushing each of the clamping arms to move toward the other clamping arm are further mounted in the housing; and two ends of each of the springs are respectively propped against a side edge of the housing and the corresponding clamping arm.

Further, the two racks are arranged side by side along a thickness direction of the housing; each of the racks is located at a corresponding position of one side of the corresponding clamping arm; and the corresponding spring is located at a corresponding position of the other side of the clamping arm.

Further, an opening for accommodating the corresponding spring is correspondingly formed on each of the clamping arms; baffle plates stretching into the openings are correspondingly arranged at the side edge of the housing; and certain ends of the springs are propped against the baffle plates, and the other ends of the springs are propped against sidewalls, close to one end of the other clamping arm, of the openings.

Further, the electric vehicle holder further includes sensors configured to sense a human hand touch so that the circuit board controls the electric mechanism to drive the two clamping arms away from each other; and the sensors are mounted at the side edge of the housing.

Further, the sensors are respectively mounted on two sides of the housing.

Beneficial Effects

The electric vehicle holder provided by the present application has the following beneficial effects: compared with the prior art, by arranging the electric mechanism and arranging the normally open circuit on the circuit board, when the electric vehicle holder is powered on, the two clamping arms are opened; since the clamping arms do not need to be opened manually, the installation of the tablet electronic device is convenient; moreover, with the detector, when the tablet electronic device is detected to be placed between the two clamping arms, the electric mechanism controls the two clamping arms to move close to each other to clamp the tablet electronic device, and thus the use is convenient.

BRIEF DESCRIPTION OF DRAWINGS

In order to illustrate the technical solutions in the embodiments of the present application more clearly, the accompanying drawings used in description of the embodiments or the prior art will be briefly described below. Apparently, the accompanying drawings in the following description show merely some embodiments of the present application. A person of ordinary skill in the art may still derive other accompanying drawings from these accompanying drawings without creative efforts.

Main numerals used in the drawings are as follows:

11: housing; 111: bottom shell; 112: cover shell; 113: protective frame; 114: through hole; 115: baffle plate; 116: limiting plate; 117: guide groove; 12: circuit board; 13: detection switch; 14: wireless charging coil; 15: supporting plate; 151: convex rib; 16: sensor;

20: clamping arm; 21: clamping plate; 22: sliding arm; 221: opening; 222: convex column; 223: accommodating groove; 23: rubber pad; 24: shifting piece; 25: spring;

30: electric mechanism; 31: rack; 311: push plate; 32: gear; 33: motor.

DESCRIPTION OF EMBODIMENTS

To make the technical problems to be solved, technical solutions, and beneficial effects of the present application clearer and more comprehensible, the present application will be further described in detail below in combination with the accompanying drawings and embodiments. It should be understood that the specific embodiments described herein are merely used to explain the present application and are not intended to limit the present application.

It is to be noted that when an element is referred to as being "fixed" or "arranged" on another element, it can be directly or indirectly on another element. When an element is referred to as being "connected" to another element, it can be directly or indirectly connected to another element.

In addition, the terms such as "first" and "second" are merely for a descriptive purpose, and cannot be understood as indicating or implying a relative importance, or implicitly indicating the number of the indicated technical features. Hence, the features defined by "first" and "second" can explicitly or implicitly include one or more features. In the description of the present application, "a plurality of" means two or more, unless otherwise specifically defined. The meaning of "a plurality of" is one or more unless otherwise specifically defined.

In the description of the present application, it should be understood that, orientation or position relationships indicated by the terms "center", "length", "width", "thickness", "upper", "lower", "front", "back", "left", "right", "vertical", "horizontal", "top", "bottom", "inner", "outer" and the like are based on the orientation or position relationships as shown in the accompanying drawings, for ease of the description of the present application and simplifying the description only, rather than indicating or implying that the indicated device or element must have a particular orientation or be constructed and operated in a particular orientation. Therefore, these terms should not be understood as a limitation to the present application.

In the description of the present application, it should be understood that, unless otherwise specified and defined, the terms "installation", "connected with", "connected to" should be comprehended in a broad sense. For example, these terms may be comprehended as being fixedly connected, detachably connected or integrally connected; mechanically connected or electrically connected; or directly connected or indirectly connected through an intermediate medium, or in an internal communication between two elements. The specific meanings about the foregoing terms in the present application may be understood by those skilled in the art according to specific circumstances.

Referring to FIGS. 1 to 8 together, an electric vehicle holder provided by the present application will now be described. The electric vehicle holder includes a housing 11, two clamping arms 20, an electric mechanism 30, a circuit board 12, a power supply module (not shown in the figures), and a detector; the two clamping arms 20 are respectively inserted into two sides of the housing 11; and ports (not shown in the figures) into which the clamping arms 20 are inserted are correspondingly formed at a side edge of the housing 11, so as to cooperatively clamp a tablet electronic device such as a mobile phone, thereby mounting the tablet electronic device on the housing 11 and thus supporting the tablet electronic device. The electric mechanism 30 is configured to electrically drive the two clamping arms 20 close to or away from each other. When the electric mechanism 30 drives the two clamping arms 20 away from each other, the two clamping arms 20 are opened and the tablet electronic device is placed between the two clamping arms 20; and when the electric mechanism 30 drives the two clamping arms 20 close to each other, the two clamping arms 20 are closed and the tablet electronic device may be clamped. The power supply module and the circuit board 12 are mounted in the housing 11, and the power supply module is electrically connected to the circuit board 12, so that the circuit board 12 is powered by the power supply module. The circuit board 12 is electrically connected to the electric mechanism 30 so that the electric mechanism 30 may be controlled to work. A normally open circuit is arranged on the circuit board 12. With the normally open circuit, when the power supply module 12 is powered on, the electric mechanism 30 is controlled to drive the two clamping arms 20 away from each other, the two clamping arms 20 are opened and the tablet electronic device is placed between the two clamping arms 20. The two clamping arms 20 do not need to be pulled open manually. The detector is electrically connected to the circuit board 12, and the detector is configured to detect whether the tablet electronic device is placed on the housing 11 or not, i.e., to detect whether the tablet electronic device is placed between the two clamping arms 20 or not; and when the detector detects that the tablet electronic device is placed between the two clamping arms 20, the circuit board 12 controls the electric mechanism 30 to drive the two clamping arms 20 close to each other to clamp the tablet electronic device.

According to the electric vehicle holder provided by the present application, compared with the prior art, by arranging the electric mechanism 30 and arranging the normally open circuit on the circuit board 12, when the electric vehicle holder is powered on, the two clamping arms 20 are opened; since the clamping arms 20 do not need to be opened manually, the installation of the tablet electronic device is convenient; moreover, with the detector, when the tablet electronic device is detected to be placed between the two clamping arms 20, the electric mechanism 30 controls the two clamping arms 20 to move close to each other to clamp the tablet electronic device, so the use is convenient.

Figure 2:
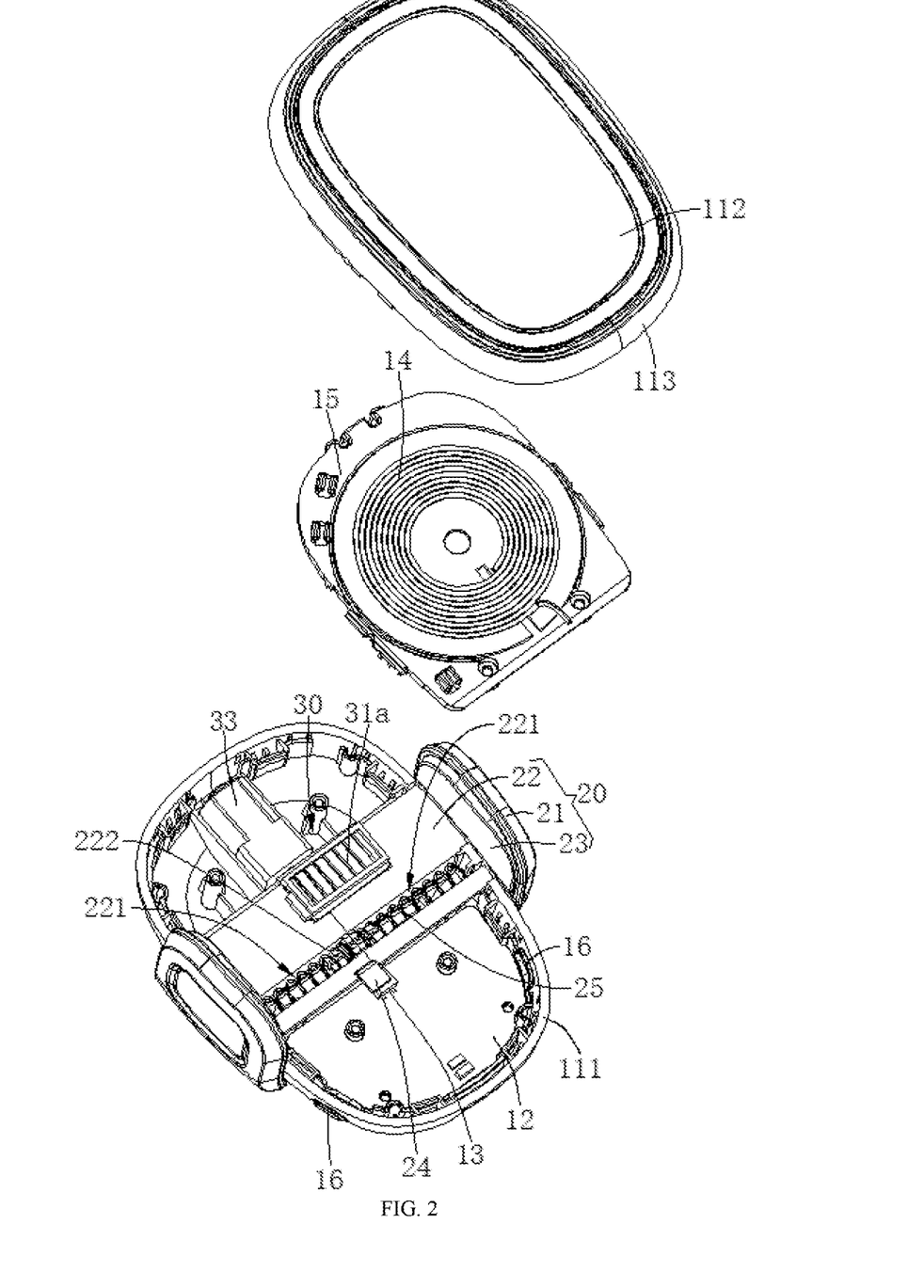
FIG. 2 is a first exploded structural schematic diagram of an electric vehicle holder according to an embodiment of the present application.
Figure 3:
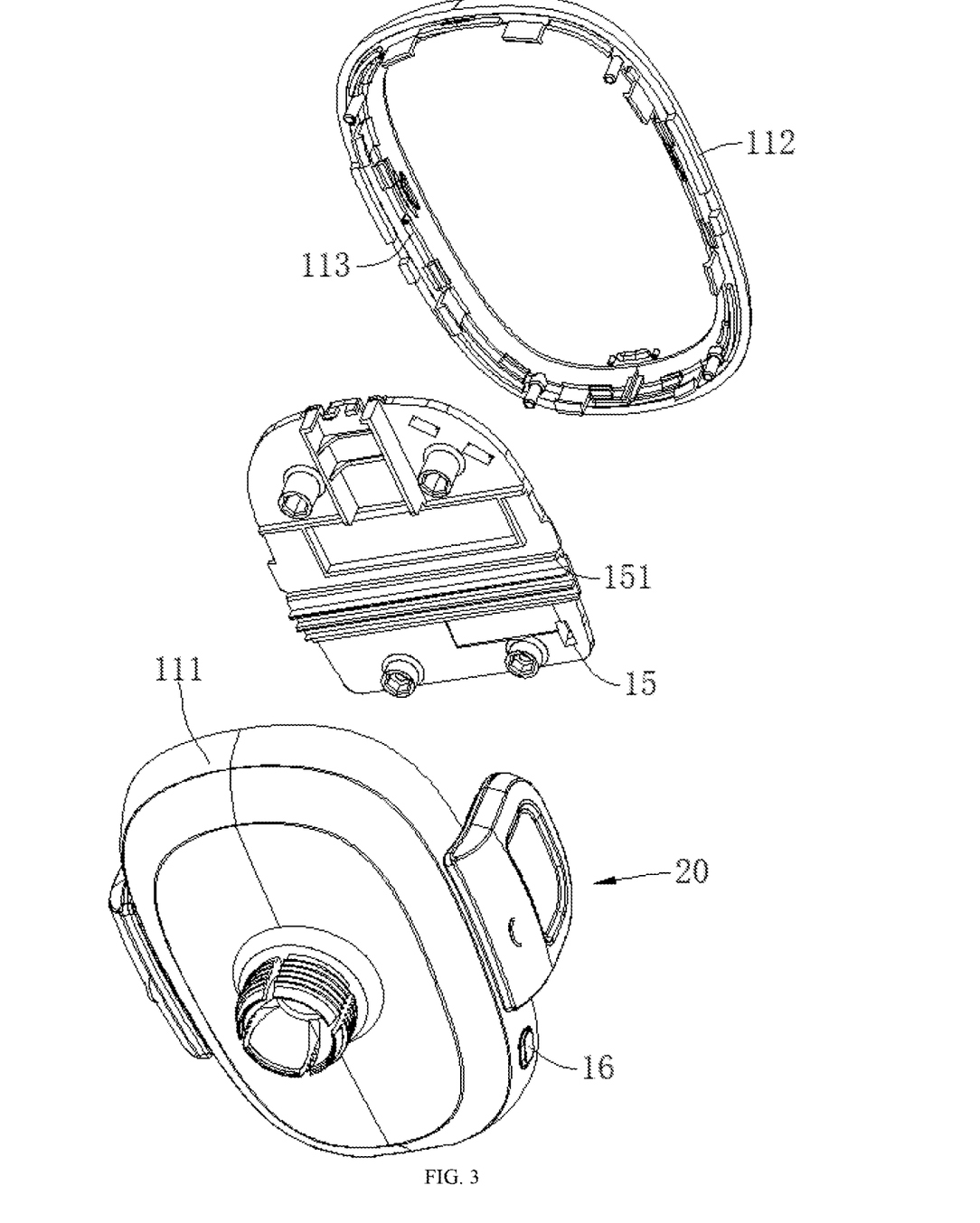
FIG. 3 is a second exploded structural schematic diagram of an electric vehicle holder according to an embodiment of the present application.
Figure 4:
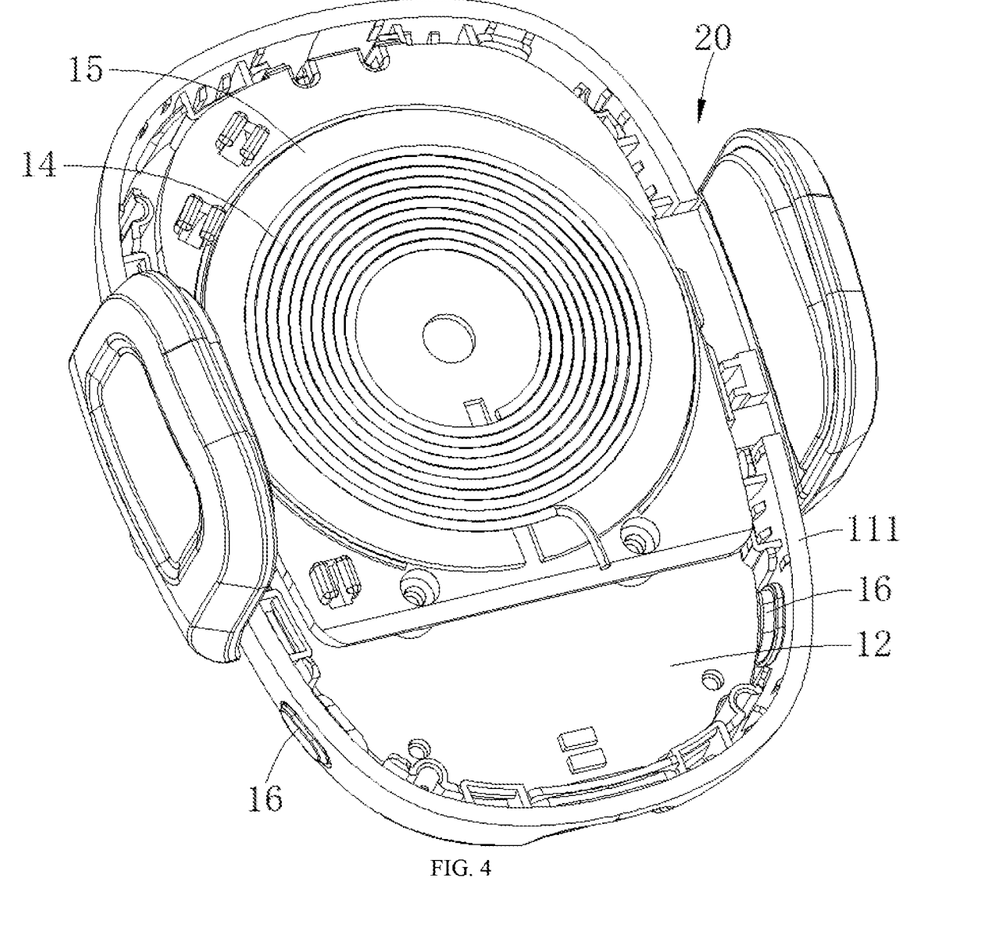
FIG. 4 is an internal structural schematic diagram when a wireless charging coil is mounted in a housing in FIG. 2.

Further, referring to FIGS. 2 to 4, as a specific embodiment of the electric vehicle holder provided by the present application, the detector is a wireless charging coil 14; the wireless charging coil 14 is mounted in the housing 11; and the wireless charging coil 14 is electrically connected to the circuit board 12. When the tablet electronic device is placed on the housing 11, the wireless charging coil 14 generates electromagnetic induction with a wireless charging module in the tablet electronic device, thereby detecting the tablet electronic device; in addition, the tablet electronic device may also be wirelessly charged by using the wireless charging coil 14. In some other embodiments, the detector may also be an infrared sensor, an ultrasonic sensor, etc.

Further, referring to FIGS. 2 to 4, as a specific embodiment of the electric vehicle holder provided by the present application, a supporting plate 15 is further mounted in the housing 11, and the wireless charging coil 14 is mounted on the supporting plate 15. With the supporting plate 15, the effect of supporting the wireless charging coil 14 may be taken, the heat of the wireless charging coil 14 may be dissipated, and the wireless charging coil 14 is mounted in the housing 11 conveniently.

Figure 1:
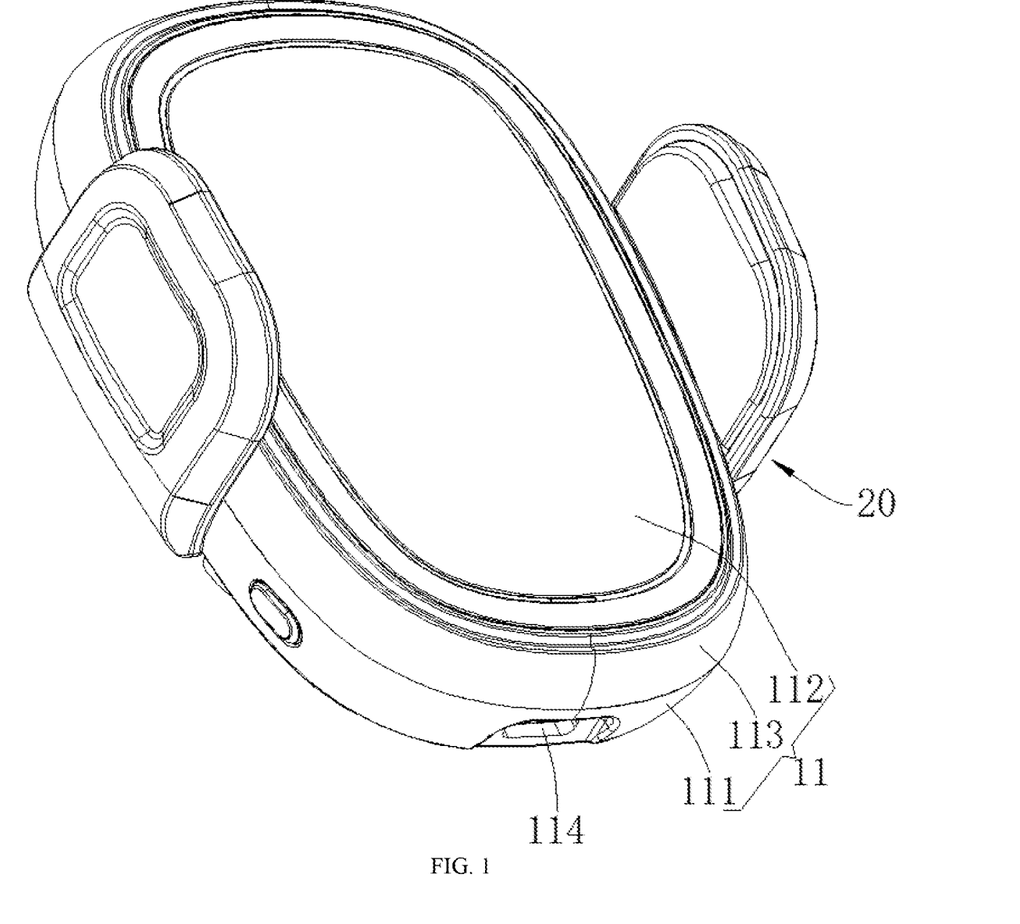
FIG. 1 is a structural schematic diagram of an electric vehicle holder according to an embodiment of the present application.

Further, referring to FIGS. 1 to 3, as a specific embodiment of the electric vehicle holder provided by the present application, the housing 11 includes a bottom shell 111 and a cover shell 112; the cover shell 112 covers the bottom shell 111; and the circuit board 12 and the electric mechanism 30 are mounted on the bottom shell 111. With the bottom shell 111 and the cover shell 112, each component may be assembled conveniently.

Further, referring to FIGS. 1 to 3, as a specific embodiment of the electric vehicle holder provided by the present application, the housing 11 further includes a protective frame 113 disposed at the periphery of the cover shell 112; and the protective frame 113 is buckled on the cover shell 112 to protect edges of the cover shell 112. In some embodiments, a metal frame may be adopted by the protective frame 113 to better protect the cover shell 112. In some embodiments, a rubber frame may be adopted by the protective frame 113, so that a cushioning effect is taken, the friction with the tablet electronic device is reduced and thus the tablet electronic device is protected. In some other embodiments, it may be appropriate to only provide the cover shell 112, or mould the cover shell 112 and the protective frame 113 integrally.

Further, referring to FIGS. 1 to 3, as a specific embodiment of the electric vehicle holder provided by the present application, the power supply module is an electric connection interface (not shown in the figures). The electric connection interface is electrically connected to the circuit board 12, so as to be connected to an external power source such as a power line to power the circuit board 12. A through-hole 114 for exposing the electric connection interface is correspondingly formed on the housing 11. Further, the electric connection interface is formed at a lower end of the housing 11 to facilitate connection with an external charging line. Certainly, in some embodiments, it is also possible to install a battery in the housing 11 and use the battery as the power supply module.

Figure 5:
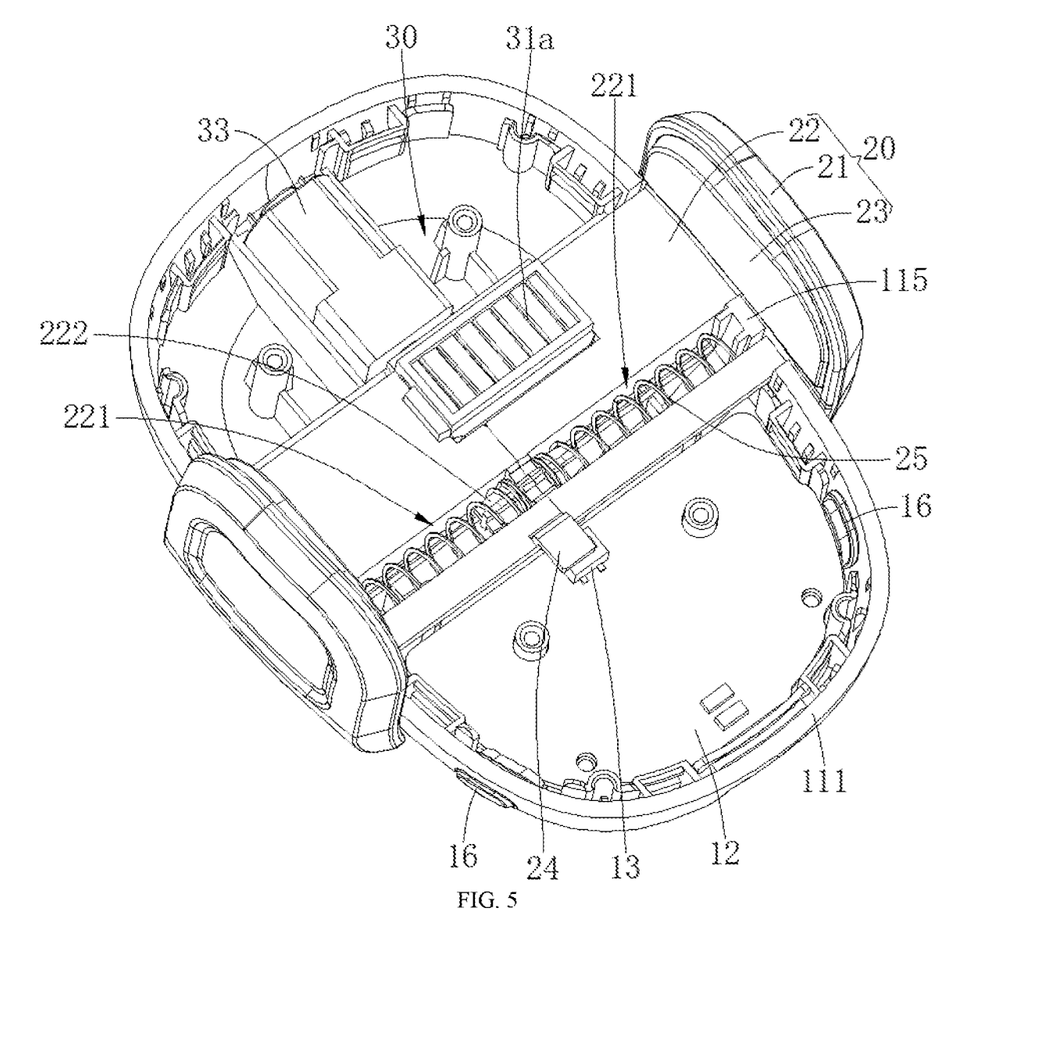
FIG. 5 is a structural schematic diagram when a bottom shell, an electric mechanism, clamping arms and a circuit board are combined in FIG. 2.
Figure 6:
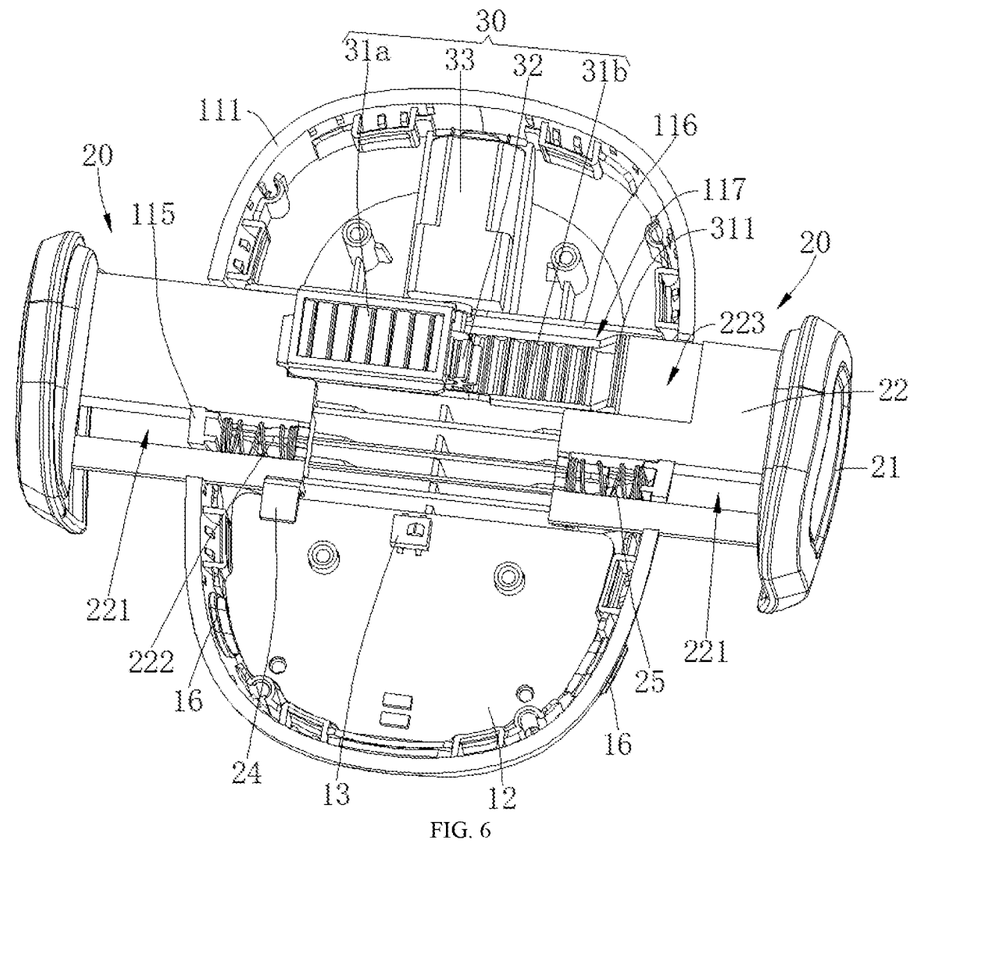
FIG. 6 is a structural schematic diagram when racks push the clamping arms to open in FIG. 5.
Figure 7:
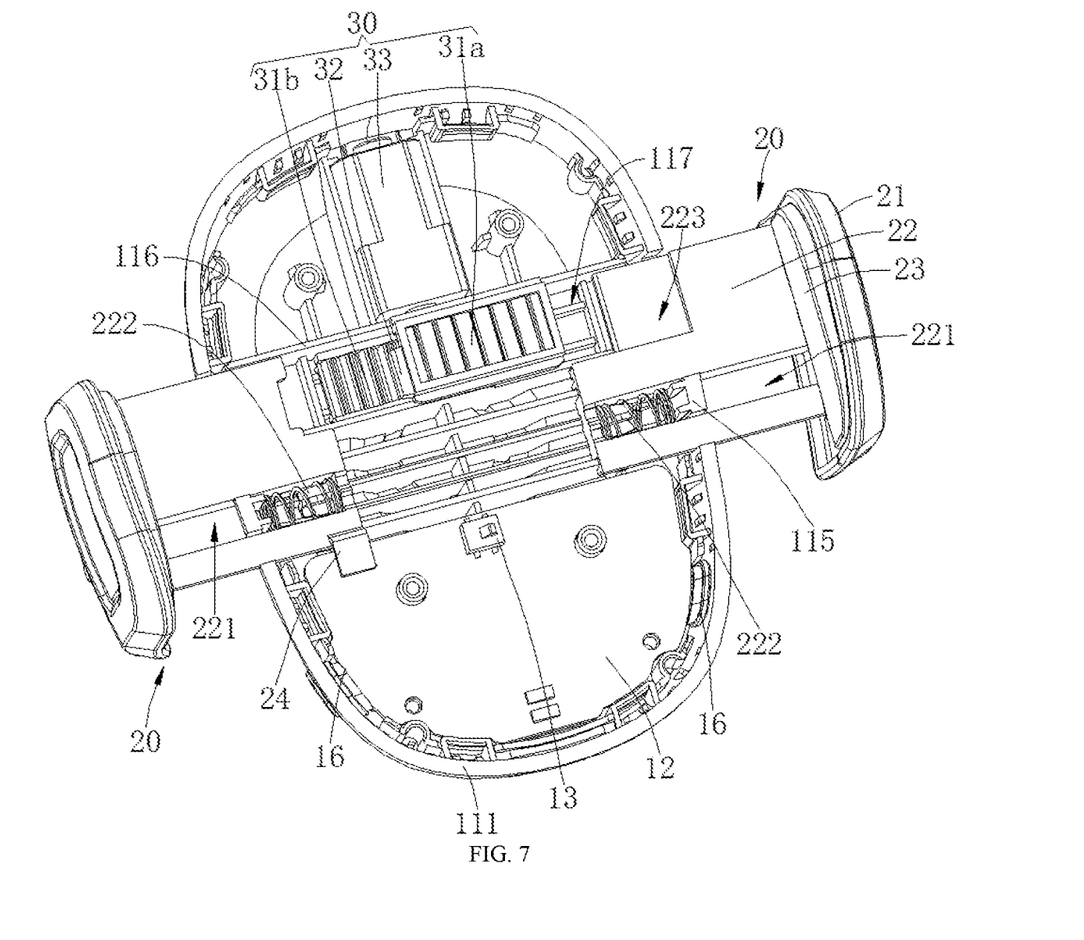
FIG. 7 is a structural schematic diagram when two clamping arms are opened in FIG. 5.
Figure 8:
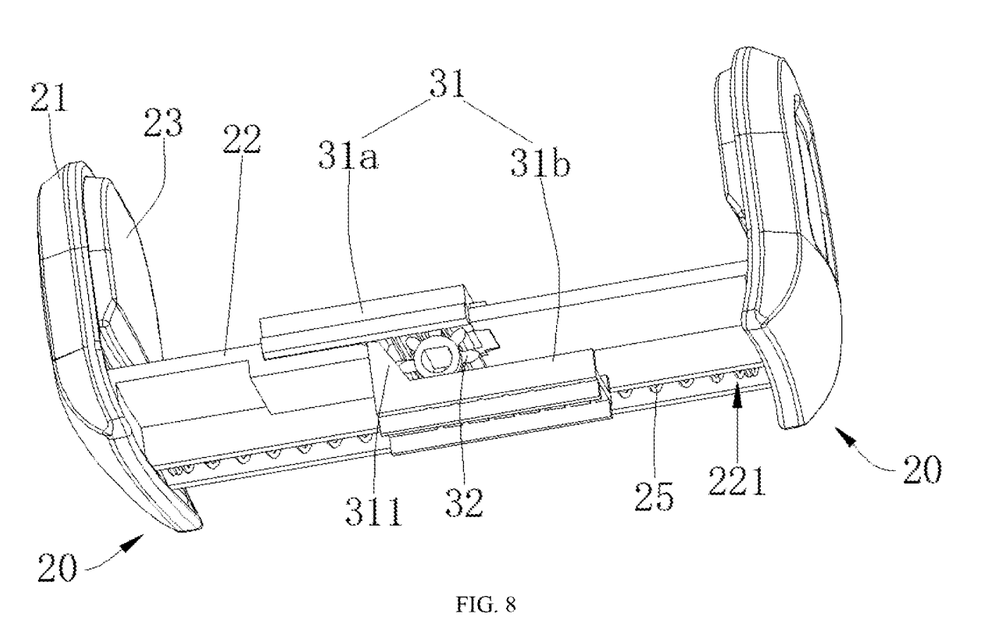
FIG. 8 is an enlarged structural schematic diagram when the clamping arms, the racks and a gear are combined in FIG. 5.

Further, referring to FIGS. 5 to 7, as a specific embodiment of the electric vehicle holder provided by the present application, a detection switch 13 is arranged in the housing 11 and the detection switch 13 is configured to determine whether a tablet electronic device is clamped between the two clamping arms 20 or not. A shifting piece 24 for pushing the detection switch 13 is arranged on one of the clamping arms 20; and the detection switch 13 is electrically connected to the circuit board 12. When the tablet electronic device is clamped between the two clamping arms 20, the shifting piece 24 is moved away from the detection switch 13. At this moment, the electric mechanism 30 does not drive the two clamping arms 20 away from each other, thereby preventing the tablet electronic device clamped between the two clamping arms 20 from dropping. When the two clamping arms are close to each other, the shifting piece 24 shifts the detection switch 13 and thus it may be determined that the tablet electronic device is not clamped between the two clamping arms 20; and then the electric mechanism 30 drives the two clamping arms 20 away from each other to clamp the tablet electronic device.

Further, referring to FIGS. 5 to 7, as a specific embodiment of the electric vehicle holder provided by the present application, the detection switch 13 is located at a middle corresponding position between the two clamping arms 20. In this embodiment, the detection switch 13 is located at a middle corresponding position of the housing 11 in a width direction.

Further, referring to FIGS. 5 to 7, as a specific embodiment of the electric vehicle holder provided by the present application, the detection switch 13 is mounted on the circuit board 12 to facilitate the electrical connection between the detection switch 13 and the circuit board 12, and facilitate the supporting of the circuit board 12. In some other embodiments, the detection switch 13 may also be directly fixed on the housing 11.

Further, referring to FIGS. 5 to 7, as a specific embodiment of the electric vehicle holder provided by the present application, a limit switch is disposed in the housing 11; the limit switch is configured to limit a stroke that the two clamping arms 20 are away from each other; a shifting plate for pushing the limit switch is arranged on one of the clamping arms 20; and the limit switch is electrically connected to the circuit board 12. The limit switch and the shifting plate are arranged, and the electric mechanism 30 drives the two clamping arms 20 away from each other. When the shifting plate shifts the limit switch, the circuit board 12 controls the electric mechanism 30 to shut down, so that the two clamping arms 20 are kept open to limit the distance that the two clamping arms 20 are opened. In some other embodiments, the distance that the two clamping arms 20 are opened may also be controlled by controlling a working time of the electric mechanism 30. In some embodiments, the shifting plate and the shifting piece 24 may share the same structure.

Further, referring to FIGS. 5 to 7, as a specific embodiment of the electric vehicle holder provided by the present application, the limit switch is mounted on the circuit board 12 to facilitate the electrical connection between the limit switch and the circuit board 12, and facilitate the supporting of the circuit board 12. In some other embodiments, the limit switch may also be directly fixed to the housing 11.

Further, referring to FIGS. 5 to 8, as a specific embodiment of the electric vehicle holder provided by the present application, the electric mechanism 30 includes two racks 31, a gear 32 and a motor 33; the two racks 31 are respectively disposed on two sides of the gear 32; the gear 32 is meshed with the two racks 31; and the gear 32 is mounted on the motor 33. The gear 32 is driven by the motor 33 to rotate, thereby driving the two racks 31 to move synchronously and reversely; hence, the two racks 31 respectively push the two clamping arms 20 away from each other; the motor 33 is mounted in the housing 11, and the motor 33 is electrically connected to the circuit board 12. The structure is simple and convenient to machine and use; and meanwhile, the two clamping arms 20 may also be pushed conveniently to move. In some other embodiments, two linear motors 33 may also be used to respectively push the two clamping arms 20 to move. In some embodiments, other electric devices may also be used.

Further, referring to FIGS. 5 to 8, as a specific embodiment of the electric vehicle holder provided by the present application, springs 25 for respectively pushing each of the clamping arms 20 to move toward the other clamping arm 20 are further mounted in the housing 11, and the two ends of each of the springs 25 are respectively propped against a side edge of the housing 11 and the corresponding clamping arm 20. With the springs 25, the two clamping arms 20 are pulled conveniently and elastically to move close to each other, thereby facilitating the cooperative clamping of the tablet electronic device by the two clamping arms 20. In addition, when the tablet electronic device is clamped by the structure, the electric mechanism 30 may not need to be powered on to save the electricity.

Further, referring to FIGS. 5 to 8, as a specific embodiment of the electric vehicle holder provided by the present application, corresponding clamping arms 20 of the two racks 31 both are of a split structure, so that when the electric vehicle holder is powered off, the two clamping arms 20 may be manually pulled away from each other and are opened, and then the two clamping arms 20 are pulled by the springs 25 to move close to each other to clamp the tablet electronic device. Certainly, in some other embodiments, the two racks 31 may be respectively and fixedly connected to the two clamping arms 20.

Further, referring to FIGS. 5 to 8, as a specific embodiment of the electric vehicle holder provided by the present application, the motor 33 is a self-locking motor so that the two clamping arms 20 may be positioned.

Further, referring to FIGS. 5 to 8, as a specific embodiment of the electric vehicle holder provided by the present application, the two racks 31 are arranged side by side along a thickness direction of the housing 11; each rack 31 is located at a corresponding position of one side of the corresponding clamping arm 20, and the corresponding spring 25 is located at a corresponding position of the other side of the clamping arm 20. By adopting the structure, the widths of the clamping arms 20 may be set to be larger to increase the strengths of the clamping arms 20 and facilitate the installation of each of the spring 25 and the racks 31 as well as the gear 32.

Further, limiting plates 116 are respectively and convexly arranged at corresponding positions of the two sides of each of the racks 31 in the bottom shell 111, and a guide groove 117 is formed between the two limiting plates 116 to guide the movement of the two racks 31. By adopting the structure, the racks 31 may be located conveniently.

Further, referring to FIGS. 5 to 8, as a specific embodiment of the electric vehicle holder provided by the present application, an opening 221 for accommodating the corresponding spring 25 is correspondingly formed on each of the clamping arms 20; baffle plates 115 stretching into the openings 221 are correspondingly arranged at the side edge of the housing 11; and certain ends of the springs 25 are propped against the baffle plates 115, and the other ends of the springs 25 are propped against sidewalls, close to one end of the other clamping arm 20, of the openings 221. By adopting the structure, the springs 25 are mounted conveniently; and meanwhile, the springs 25 are also located conveniently.

Still further, a convex column 222 is convexly arranged on a sidewall of a corresponding end portion of each of the openings 221. The corresponding ends of the springs 25 sleeve the corresponding convex columns 222, so that the springs 25 are located and mounted conveniently.

Further, referring to FIGS. 5 to 8, as a specific embodiment of the electric vehicle holder provided by the present application, a push plate 221 for pushing the corresponding clamping arm 20 is arranged at one end of the rack 31b close to a bottom of the housing 11; and an accommodating groove 223 into which the other rack 31a is stretched is formed on the clamping arm 20. A push plate 311 is disposed on the rack 31 close to the bottom of the housing 11 so as to push the corresponding clamping arm 20 to move. Moreover, the accommodating groove 223 is formed on the clamping arm 20. When the two clamping arms 20 are close to each other, the rack 31a located at a top of the housing 11 may be stretched into the accommodating groove 223. By adopting the structure, the space occupied by the rack 31 may be reduced. Furthermore, the clamping arms 20 may be made longer so that the two clamping arms 20 may clamp a wider tablet electronic device.

Further, referring to FIGS. 5 to 8, as a specific embodiment of the electric vehicle holder provided by the present application, each of the clamping arms 20 includes a clamping plate 21 and a sliding arm 22, the clamping plate 21 is mounted at one end of the sliding arm 22, and the other end of the sliding arm 22 is slidably inserted into the housing 11. The openings 221 are formed on the sliding arms 22, and the shifting piece 24 is mounted on one sliding arm 22. The clamping arms 20 with this structure are convenient to manufacture. Further, a rubber pad 23 is respectively provided on the clamping plates 21 to better clamp the tablet electronic device.

Further, referring to FIG. 3, FIGS. 5 to 8, as a specific embodiment of the electric vehicle holder provided by the present application, the supporting plate 15 cooperatively covers the clamping arms 20; and convex ribs 151 are arranged on the supporting plate 15 so as to cooperate with the bottom shell 111 to guide the clamping arms 20 to move.

Further, referring to FIG. 1, FIG. 4, FIG. 5 and FIG. 7, as a specific embodiment of the electric vehicle holder provided by the present application, the electric vehicle holder further includes sensors 16, and the sensors 16 are mounted at the side edge of the housing 11. The sensors 16 are configured to sense a human hand touch, so that the circuit board 12 controls the electric mechanism 30 to drive the two clamping arms 20 away from each other. With the sensors 16, after the tablet electronic device is clamped on the electric vehicle holder, if the tablet electronic device needs to be taken off, the sensors 16 may be touched, so that the electric mechanism 30 may control the two clamping arms 20 to open to take off the tablet electronic device conveniently. The sensors 16 are arranged at the side edge of the housing 11, so the sensors 16 may be conveniently touched when the tablet electronic device is taken off.

Still further, the sensors 16 are disposed at positions, close to the lower end of the housing 11, of the side edge of the housing 11, so as to be more conveniently touched by a human hand when the tablet electronic device is taken off.

Still further, the sensors 16 are respectively mounted on two sides of the housing 11 so that the sensors 16 may be better touched when the tablet electronic device is taken off. As a result, a driving motor drives the two clamping arms 20 away from each other.

The above is only the preferred embodiment of the present application, and is not intended to limit the present application. Any modifications, equivalent replacements and improvements made within the spirit and principles of the present application should be within the scope of protection of the present application.

What is claimed is:

1. An electric vehicle holder, comprising a housing, wherein clamping arms are respectively inserted into two sides of the housing; the electric vehicle holder further comprises an electric mechanism configured to drive the two clamping arms close to or away from each other, a circuit board mounted in the housing, and a power supply module electrically connected to the circuit board; a normally open circuit configured to control the electric mechanism to drive the two clamping arms away from each other when the power supply module is powered on is arranged on the circuit board; the electric mechanism is electrically connected to the circuit board; and a detector configured to enable, upon the detection of that a tablet electronic device is placed on the housing, the circuit board to control the electric mechanism to drive the two clamping arms close to each other to clamp the tablet electronic device is further arranged in the housing.

2. The electric vehicle holder according to claim 1, wherein the detector is a wireless charging coil; the wireless charging coil is mounted in the housing; and the wireless charging coil is electrically connected to the circuit board.

3. The electric vehicle holder according to claim 2, wherein a supporting plate is further mounted in the housing, and the wireless charging coil is mounted on the supporting plate.

4. The electric vehicle holder according to claim 1, wherein a detection switch for limiting a stroke that the two clamping arms are away from each other is disposed in the housing; a shifting piece for pushing the detection switch is arranged on one of the clamping arms; and the detection switch is electrically connected to the circuit board.

5. The electric vehicle holder according to claim 4, wherein the detection switch is arranged at a middle position of the housing in a width direction.

6. The electric vehicle holder according to claim 4, wherein the detection switch is mounted on the circuit board.

7. The electric vehicle holder according to claim 1, wherein a limit switch for limiting the stroke that the two clamping arms are away from each other is disposed in the housing; a shifting plate for pushing the limit switch is arranged on one of the clamping arms; and the limit switch is electrically connected to the circuit board.

8. The electric vehicle holder according to claim 1, wherein the electric mechanism includes two racks for respectively pushing the two clamping arms away from each other, a gear configured to drive the two racks to move synchronously and reversely, and a motor configured to drive the gear to rotate; the two racks are respectively disposed on two sides of the gear; and the gear is meshed with the two racks.

9. The electric vehicle holder according to claim 8, wherein springs for respectively pushing each of the clamping arms to move toward the other clamping arm are further mounted in the housing; and two ends of each of the springs are respectively propped against a side edge of the housing and the corresponding clamping arm.

10. The electric vehicle holder according to claim 9, wherein the two racks are arranged side by side along a thickness direction of the housing; each of the racks is located at a corresponding position of one side of the corresponding clamping arm; and the corresponding spring is located at a corresponding position of the other side of the clamping arm.

11. The electric vehicle holder according to claim 10, wherein an opening for accommodating the corresponding spring is correspondingly formed on each of the clamping arms; baffle plates stretching into the openings are correspondingly arranged at the side edge of the housing; and certain ends of the springs are propped against the baffle plates, and the other ends of the springs are propped against sidewalls, close to one end of the other clamping arm, of the openings.

12. The electric vehicle holder according to claim 10, wherein a push plate for pushing the corresponding clamping arm is arranged at one end of the rack close to a bottom of the housing.

13. The electric vehicle holder according to claim 12, wherein an accommodating groove into which another rack is stretched is formed on the clamping arm pushed by the push plate.

14. The electric vehicle holder according to according to claim 1, wherein the electric vehicle holder further comprises sensors configured to sense a human hand touch so that the circuit board controls the electric mechanism to drive the two clamping arms away from each other; and the sensors are mounted at the side edge of the housing.

15. The electric vehicle holder according to claim 14, wherein the sensors are respectively mounted on the two sides of the housing.

\* \* \* \* \*